Aug. 16, 1932.  W. E. KINNISON  1,871,891
ART OF FILTRATION
Filed April 17, 1930   2 Sheets-Sheet 1

Inventor:
William E. Kinnison,
By Dyrenforth, Lee, Chritton & Wiles,
Attys.

Aug. 16, 1932.  W. E. KINNISON  1,871,891
ART OF FILTRATION
Filed April 17, 1930  2 Sheets-Sheet 2

Inventor:
William E. Kinnison,
By Dyrenforth, Lee, Chritton and Wiles
Attys

Patented Aug. 16, 1932

1,871,891

UNITED STATES PATENT OFFICE

WILLIAM E. KINNISON, OF CASPER, WYOMING, ASSIGNOR TO STANDARD OIL COMPANY OF INDIANA, OF WHITING, INDIANA, A CORPORATION OF INDIANA

ART OF FILTRATION

Application filed April 17, 1930. Serial No. 445,052.

Figure 1:
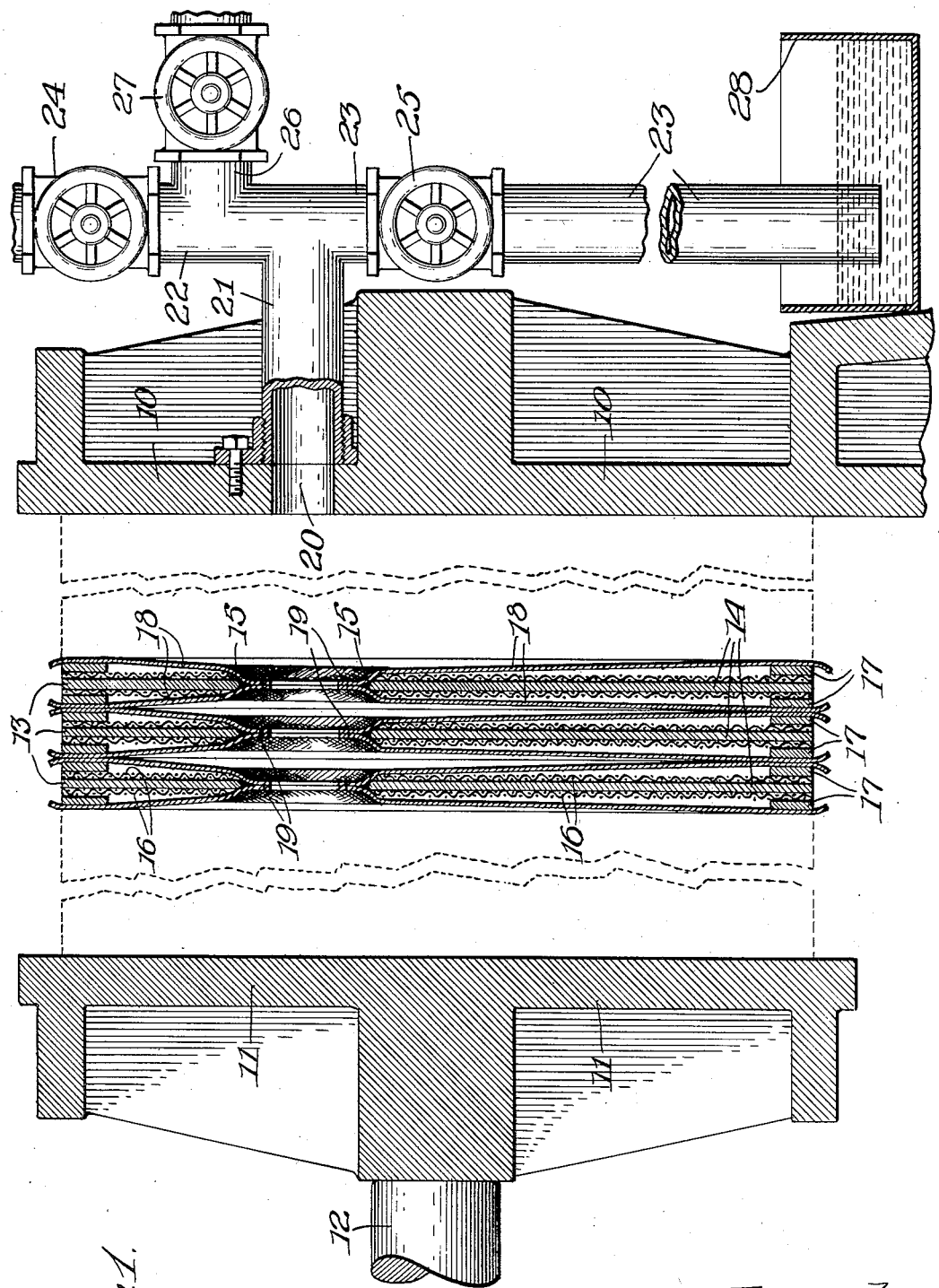
Figure 2:
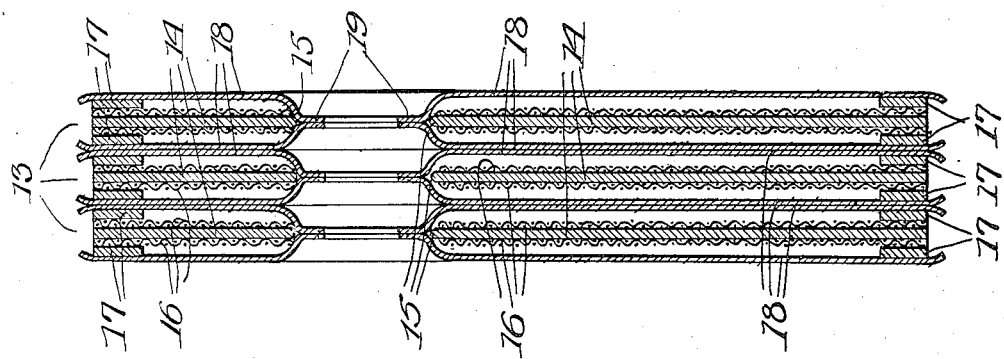

The present invention relates to the art of filtration, and more particularly to the filtration of paraffin wax, or other wax, or fusible substance from chilled oil, or other vehicle. The invention will be fully understood from the following description, illustrated by the accompanying drawings, in which Figure 1 is a broken longitudinal sectional view of a filter press, only a few of the filter members or plates being shown; and Fig. 2 is a longitudinal sectional view of the filter members or plates shown in Fig. 1, showing them in expanded condition when sub-atmospheric pressure is applied to the press for the removal of liquid from the wax space between the filter elements.

Referring more particularly to the drawings, the numeral 10 indicates the stationary head of a filter press, which may be mounted upon a suitable support, and the numeral 11, the movable head, which may be forced in the direction of the stationary head 10 by means of the plunger 12, actuated by hydraulic or other suitable means. The arrangement of these parts may be that customary in filter presses, and is not described herein, in detail.

A plurality of filter members 13 are disposed between the heads 10 and 11 of the press. The filter members 13 may be mounted for slidable longitudinal movement relative to the heads and preferably are of circular conformation. Each filter member 13 contains a central disk or plate 14 provided with an opening 15 preferably located above its center. On each side of plate 14 is mounted a disk 16 of woven wire or similar perforate material, these disks 16 being of substantially the same area as the plate 14 and being provided with openings alining with the opening 15 in plate 14. Rings 17 securely fastened on each side of the disks 14 serve to hold the perforate disks 16 in position and likewise form thickened rims for the filter member itself.

A flexible filter sheet or blanket 18 comprising any suitable porous sheet material, such as woven fabric, wire, or both wire and fabric, is applied on each side of the filter members, such cloths being provided with openings aligning with, but somewhat smaller in diameter than, the openings 15 of plates 14. The filter cloths 18, 18, on both sides of each filter member or disk 13 are sewed tightly together around their openings within the opening 15 in each plate 14, as shown at 19, and the outer edges of the cloths may be suitably loosely stitched together in any suitable manner, preferably at intervals, in order to maintain the cloths in proper position when the filter members 13 are not pressed together between the heads 10 and 11. The filter members 13 are mounted between the heads of the press, and in normal operation are held tightly together by pressure applied to the movable head 11. The cloths or blankets 18 preferably are so formed that they are capable of being expanded or flexed outwardly and into contact with the cloth of the next adjacent filter element, as shown in Fig. 2. To obtain this result, or function, the cloths may be cut rather full or loose.

The stationary head 10 is provided with an opening 20, alined with the openings through the filter elements of the press. A feed pipe 21 communicates with the opening 20 and is connected to a pair of pipes 22 and 23 provided, respectively, with valves 24 and 25. A pipe 26, provided with a valve 27 communicates with pipe 22, preferably at a point intermediate the valve 24 and its juncture with the pipe 21. The pipe 22 may lead from a suitable source of the chilled oil to be filtered, while the pipe 26 may lead from a source of hot liquid, such as water.

The pipe 23 extends downwardly to a point substantially below the lower edges of the filter elements 13 and preferably its lower end is closed by means of a liquid seal which may be maintained by any suitable means, such as the sump-box, shown at 28.

In operation, the press being considered to have been previously chilled, chilled oil containing paraffin wax is forced into the press under pressure through pipes 22 and 21, valve 24 being open and valves 25 and 27 being closed. The entire press during the operation is held under pressure in the customary manner. The oil flows through the alined openings in the filter elements 13, filling the spaces between such members, which spaces are generally called the wax spaces, and filters through the filter cloths, and into the interior of the filter members 13. The filtered oil drains from the interior of the leaves through the spaces formed by the wire mesh screens 16 inserted between the rings 17 and plates 14 of the filter members. The wax deposits upon the filter cloths 18 and gradually fills the wax spaces. When the latter are substantially filled the introduction of chilled oil is stopped. The wax may be removed from the spaces between the filter elements in accordance with the method disclosed in U. S. patent to Fifield, No. 1,455,436, wherein hot fluid is employed to melt the wax and force it through the filter elements and out of the filter.

To effect removal of the wax, water at a suitable temperature (above 180° F. and preferably about 200° F.) is introduced into the press through pipes 27, 22 and 21, valve 27 being open and valves 24 and 25 being closed. The hot water rapidly melts the wax in the press, the relatively high position of the liquid passageway formed by the openings in the filter elements causing all the wax above the passage as well as that below it to be melted. Suitable pressure may be maintained upon the water and the melted wax drains through the filter cloths into the interior of the filter members and out of the press through the spaces formed between the rings 17 and plates 14 by the wire mesh screens 16. The melted wax is separately collected for further treatment after separation of water from the melted wax by settling.

The removal of the water trapped in the wax-receiving spaces between the filtering elements has been a troublesome operation. This water remains within the press because the filter cloths offer sufficient resistance so that pressure is required to force fluid through them. It will be apparent that the wax remaining in the cloths will tend to increase their resistance to water. Heretofore this water has been removed by forcing compressed air into the press. But when a portion of the water has been forced out by the air, large quantities of air will pass through the filter cloths. Thus, it will be seen that the operation is very slow and inefficient.

It will be apparent that any water in the interior of the filter members 13 will readily drain out the space between the rings 17 and plates 14. According to the present invention the water remaining in the wax spaces between the filter members 13 is removed by creating a sub-atmospheric pressure within the filter press and the pipes 21 and 23. When such a sub-atmospheric pressure is applied, the cloths 18 will be drawn outwardly away from their respective plates 14 and screens 16 and toward the cloth of the next adjacent filter. Thus, the water will be forced out into the passageway formed by the aligned openings in the filter members, and through the opening 20 and pipes 21 and 23. It is preferred that the filter members be so constructed that the cloths normally assume the positions shown in Fig. 1 (Fig. 1 shows the position or condition of the cloths when the press is empty and when the pressure conditions are substantially the same on both sides of the cloth). It will be noted from Fig. 1 that the cloths under such conditions are spaced from the cloth of the next filter member adjacent the openings in the said filter members and contact each other at a point adjacent the edge of the filter members. By means of such structure, the filter cloths 18, when subatmospheric pressure is maintained within the press, will first begin to squeeze against each other adjacent their outer edges and as the water is forced out from between the filtering members and into the passageway formed by the alined openings in the filter members, more and more of the surface of the cloths will be squeezed together until they assume the position shown in Fig. 2.

In order to effect removal of water from the wax spaces between the filter members, the valve 27 in the hot water supply line 26 is left open so that water will continue to be forced into the press and through the filter members and the valve 25 in line 23 is opened. When the pipe 23 is filled with water, valve 27 is closed (valve 24 having been closed before removal of the wax was begun) and the column of water in pipe 23 will exert a siphon effect on the entire assembly, causing a sub-atmospheric pressure to be maintained within the filter press and the consequent squeezing of the water from the wax spaces by the expansion of the cloths 18. The cloths 18 are of such texture and contain sufficient wax that they will permit substantially no air to flow through them and into the press.

After the water has been removed from the press, the latter is chilled by the passage of cold pressed oil or of chilled wax-bearing oil. In the latter case the drips taken from the press before it is thoroughly chilled must again be chilled and pressed.

It is to be understood that any suitable means may be employed for effecting a sub-atmospheric pressure within the filter press, for example a suction pump may be provided in line 23.

Although the invention has been described in connection with certain specific details of operation and construction, it is not intended that these details shall be regarded as limitations upon the scope of the invention, except in so far as included in the accompanying claims.

I claim:—

1. In a filter press of the type described, parallel flexible filter elements having a discharge opening spaced from the bottom thereof, means for holding the periphery of said elements together to form a chamber for holding a slurry when the elements are flexed outwardly, and means for flexing said elements inwardly to discharge liquids from said chamber through said opening.

2. In a filter, a plurality of pairs of distensible parallel filter elements having alined openings therein spaced from the bottom thereof, means for holding together the peripheries of each pair of elements whereby a chamber is formed therebetween when said elements are distended outwardly, means for securing an element of one pair to the contiguous element of another pair of filter elements around said opening whereby a continuous conduit is formed through the filter, means for withdrawing filtrate from the spaces between said chambers, and means for flexing said filter elements in each pair toward each other for dispelling liquids from said chambers through said conduit.

3. In a filter, a plurality of pairs of distensible parallel filter elements having alined openings therein spaced from the bottom thereof, means for holding together the peripheries of each pair of elements whereby a chamber is formed therebetween when said elements are distended outwardly, means for securing an element of one pair to the contiguous element of another pair of filter elements around said opening whereby a continuous conduit is formed through the filter, means for introducing slurries and liquids into said chambers, means for withdrawing filtrate from spaces between said chambers, and a barometric tube connected with one end of said conduit, whereby liquids may be discharged from said chambers by the inward distention of the filter elements caused by the partial vacuum produced by the barometric tube.

4. In operating a filter of the type wherein adjacent portions of flexible filter cloth entrap a liquid, the method of removing the liquid therefrom which comprises flexing said portions of filter cloth whereby they are forced against each other to expel the entrapped liquid therefrom.

5. The method of claim 4 whereby the flexing of the filter elements is obtained by creating a partial vacuum between the adjacent portions of the filter cloth.

In testimony whereof, I hereunto set my signature, this 27th day of March, 1930.

WILLIAM E. KINNISON.